United States Patent [19]
Nishimura et al.

[11] Patent Number: 5,755,205
[45] Date of Patent: May 26, 1998

[54] ENGINE CONTROL SYSTEM

[75] Inventors: Hirofumi Nishimura; Tomomi Watanabe; Junichi Taga; Michihiro Imada, all of Hiroshima, Japan

[73] Assignee: Mazda Motor Corporation, Hiroshima-Ken, Japan

[21] Appl. No.: 822,881

[22] Filed: Mar. 24, 1997

[30] Foreign Application Priority Data

Mar. 29, 1996 [JP] Japan ................. 8-103207

[51] Int. Cl.$^6$ ............................................. F02P 5/00
[52] U.S. Cl. ................................................ 123/417
[58] Field of Search ........................ 123/417, 419, 123/416, 418, 436, 612, 681, 609, 414, 415, 630, 640, 643, 406, 426; 364/431.03, 431.07; 73/117.3

[56] References Cited

U.S. PATENT DOCUMENTS

| | | | |
|---|---|---|---|
| 5,213,080 | 5/1993 | Lambert et al. | 123/417 |
| 5,383,432 | 1/1995 | Cullen et al. | 123/406 |
| 5,497,328 | 3/1996 | Sugai et al. | 364/431.03 |
| 5,619,968 | 4/1997 | Hillsberg et al. | 123/417 |

FOREIGN PATENT DOCUMENTS

| | | | |
|---|---|---|---|
| 1-47614 | 10/1989 | Japan | 123/417 |
| 7-310570 | 11/1995 | Japan | 123/417 |

*Primary Examiner*—Raymond A. Nelli
*Attorney, Agent, or Firm*—Sidley & Austin; Hugh A. Abrams

[57] ABSTRACT

An engine control system in which an air fuel ratio (A/F) is controlled to a lean value closer to a stable combustion limit than a theoretical air fuel ratio under a predetermined operating range, comprising base air fuel ratio control element for setting a target air fuel ratio close to the stable combustion limit and for setting a base air fuel ratio control gain so as to accomplish the target air fuel, a combustion condition judging element for judging a combustion condition of each of cylinders of the engine, air fuel ratio compensating element for compensating the air fuel control gain based on the combustion condition judging element and ignition timing control means for setting an ignition timing in accordance with the target air fuel ratio in the predetermined operating range and for compensating the ignition timing taking account of the compensation of the air fuel ratio by the air fuel ratio compensating element. An accurate and reliable A/F control along with the ignition timing control can be accomplished to improve the fuel consumption efficiency and emission performance.

17 Claims, 14 Drawing Sheets

ENGINE CONTROL SYSTEM

BACKGROUND OF THE INVENTION

1. Field of the Invention

The present invention relates to an engine control system in which the engine operates continuously under a condition of a lean air fuel ratio (referred also to as A/F) (for example, greater than 20) which provides a leaner intake gas mixture than that under the theoretical one or the air fuel ratio of 14.7, in particular, an engine control system which controls the A/F as well as an ignition timing in a lean burn operation in which the engine is operated under a greater A/F than the theoretical value.

2. Related Art

Conventionally, various lean-burn engines have been developed that the A/F is controlled to a predetermined leaner A/F in a predetermined engine operating condition so as to improve the fuel consumption efficiency and the like. For example, it is known that a linear O2 sensor capable of detecting a leaner A/F is employed and an A/F feedback control is executed to accomplish a target lean A/F based on an output of the O2 sensor in a predetermined operating range.

However, the above linear O2 sensor and an amplifier associated therewith are expensive to thereby incur a cost increase. In view of this, it has been known that a λO2 sensor which can detect only the theoretical A/F is employed to control the A/F to the theoretical value through the A/F feedback control, and that a basic fuel injection amount is compensated through a learning control based on the A/F feedback control, thereafter the lean burn operation is executed to determine the fuel injection amount using an outcome of the learning control based on an open loop control so as to accomplish a predetermined leaner A/F as disclosed in Japanese post examined publication No. 1-47614.

Meanwhile, in establishing a leaner A/F, a stable combustion limit of A/F or leanest A/F which can provide a stable combustion of the engine varies depending on the engines as well as each of the cylinders of the engine. Thus, the target A/F cannot help being set at a richer A/F unduly far from the stable combustion limit in the lean burn operation so as to maintain a combustion stability. It is proposed that the fuel injection amount is controlled to accomplish the predetermined leaner A/F and an engine combusting condition is judged based on a crank shaft angular speed and the like to compensate the fuel injection amount in accordance with the engine combusting condition to accomplish a further leaner A/F without deteriorating the combustion stability (see for example, Japanese patent unexamined publication No.7-310570).

It should, however, be noted that the A/F of the lean burn operation would be deviated from the predetermined A/F due to the compensation of the fuel injection amount in accordance with the engine combusting condition. On the other hand, the ignition timing has been predetermined to provide an optimized ignition timing at a predetermined A/F. As a result, the ignition timing is deviated from the optimized value as the A/F is varied as aforementioned resulting in increase Nox emission and deterioration of a combustion performance.

SUMMARY OF THE INVENTION

It is therefore an object of the present invention to provide an engine control system which can improve the fuel consumption efficiency and emission performance during an A/F control along with an ignition timing control.

It is another object of the present invention to provide an engine control in which the A/F is controlled as lean as possible without deteriorating the combustion stability during the lean burn operation while controlling the ignition timing appropriately.

It is further object of the present invention to accomplish both the optimized leanest A/F and optimized ignition timing during the lean burn operation of the engine.

The above and other objects of the present invention can be accomplished by an engine control system in which an air fuel ratio is controlled to a target value providing a leaner intake gas mixture close to a stable combustion limit than that of a theoretical air fuel ratio under a predetermined operating range, comprising, base air fuel ratio control means for setting a base air fuel ratio control gain so as to accomplish a predetermined air fuel ratio greater than the theoretical air fuel ratio during a control in said predetermined operating range, combustion condition judging means for judging a combustion condition of each of cylinders of the engine, air fuel ratio compensating means for compensating the base air fuel control gain based on the judgment by the combustion condition judging means to accomplish the target air fuel ratio close to the stable combustion limit and, ignition timing control means for setting a predetermined ignition timing corresponding to said predetermined air fuel ratio and for compensating said predetermined execution ignition timing taking account of the compensation of the air fuel ratio control gain by the air fuel ratio compensating means to obtain a final ignition timing.

In a preferred embodiment, the base fuel air fuel control gain is amended to determine a final air fuel control gain to accomplish the target air fuel ratio.

In anther aspect of the present invention, an engine control system comprises operating condition detecting means for detecting an engine operating condition, fuel injection amount setting means for setting a base fuel injecting amount to accomplish a predetermined air fuel ratio greater than a theoretical air fuel ratio in a predetermined engine operating condition, combustion condition judging means for judging a combustion condition in at least one cylinder, fuel injection amount compensation means for compensating the base fuel injection amount based on the combustion condition in the cylinder so as not to misfire, ignition timing setting means for setting a predetermined ignition timing based on said predetermined air fuel ratio in the predetermined operating condition and, ignition timing compensating means for compensating said predetermined ignition timing based on the compensation of the base fuel injection amount so as to keep away from misfiring in the cylinder.

In another feature of the invention, an engine control system comprises base air fuel ratio control means for setting a base air fuel ratio control gain so as to accomplish a predetermined air fuel ratio during a control in said predetermined operating range, combustion condition judging means for judging a combustion condition of each of cylinders of the engine, air fuel ratio compensating means for compensating the base air fuel control gain based on the judgment by the combustion condition judging means to accomplish the target air fuel ratio close to the stable combustion limit and, ignition timing control means for setting a predetermined ignition timing corresponding to said predetermined air fuel ratio and for compensating said predetermined ignition timing taking account of the compensation of the air fuel ratio control gain by the air fuel ratio compensating means to get a final ignition timing.

In another aspect of the invention, an engine control system in which an air fuel ratio (A/F) is controlled to a lean value which provides a leaner intake gas mixture closer to a stable combustion limit than that under a theoretical air fuel ratio under a predetermined operating range, comprises base air fuel ratio control means for setting a target air fuel ratio close to the stable combustion limit and for setting a base air fuel ratio control gain so as to accomplish the target air fuel ratio, a combustion condition judging means for judging a combustion condition of each of cylinders of the engine, air fuel ratio compensating means for compensating the air fuel control gain based on the combustion condition judging means and ignition timing control means for setting an ignition timing in accordance with the set air fuel ratio in the predetermined operating range and for compensating the ignition timing taking account of the compensation of the air fuel ratio by the air fuel ratio compensating means.

According to the above system, the A/F is set at a greater A/F value which provides a leaner intake gas mixture than that under the theoretical A/F value during the predetermined operating range of the air fuel control. The A/F control gain is compensated in accordance with the combustion condition. As a result, the A/F is controlled to have such a larger value than the theoretical one to the extent that the combustion stability can be maintained. In addition, the ignition timing is compensated in response to the A/F control gain. Namely, the ignition timing is regulated to be optimized as the A/F varies depending on the combustion condition.

Preferably, the engine control system includes an A/F sensor for detecting a theoretical A/F, feedback control means for executing a feedback control for the A/F based on the A/F sensor in a predetermined operating condition to establish the theoretical A/F and learning control means for determining a learned value of the A/F control gain based on the feedback control. The base air fuel ratio control means sets the A/F control gain corresponding to the value of the set A/F taking account of the learned value of the A/F control gain.

In this manner, the A/F control gain determined by the base A/F control means properly corresponds to the target A/F so that the compensation of the A/F control gain and the ignition timing based on the A/F control gain set by the A/F control means can be compensated accurately.

The air fuel compensating means compensates the A/F control gain based on the judgment of the combustion condition judging means to a fuel richer side where the combustion stability is deteriorated beyond a predetermined allowance and to a fuel leaner side when the combustion stability is accomplished within a predetermined allowance. In this manner, the A/F can be controlled to a value as closest to the stable combustion limit as possible wherein the instability level is suppressed within the predetermined allowance.

The ignition timing control means may compensate to retard the ignition timing when the A/F control gain is compensated to make the intake gas mixture rich and to advance the ignition timing when the A/F control gain is compensated to make the intake gas mixture lean.

The A/F compensating means compensates the A/F control gain for each of the cylinders of the engine and the ignition timing control means also compensates the ignition timing for each of the cylinders in accordance with the compensation of the A/F control gain. Alternatively, the ignition timing control means may compensate commonly the ignition timing of all the cylinders based on a mean value of the A/F control gains of all the cylinders. In another embodiment, the ignition timing control means may compensate commonly the ignition timing for all the cylinders based on the mean compensation value of the A/F control gain for all the cylinder thereafter the ignition timing control means may make a fine adjustment of the A/F control gain for each of the cylinders in accordance with the deviation from the mean value.

If the ignition timing is compensated for each of the cylinders, the ignition timing for each of the cylinders can be controlled properly even where the combustion conditions are different between the cylinders resulting in the variations in the compensation values of the A/F control gains. If the ignition timing is commonly compensated for all the cylinders, the ignition timing can be controlled properly even where the fuel injection properties vary between cylinders resulting in variations of the A/F control gain compensations. In addition, If the ignition timing is compensated commonly for all the cylinders and thereafter compensated minutely for the individual cylinders, the ignition timing can be adjusted properly even where both the combustion conditions and the fuel injection properties vary between cylinders.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Hereinafter, the present invention is described in detail taking reference with the attached drawings.

Figure 1:
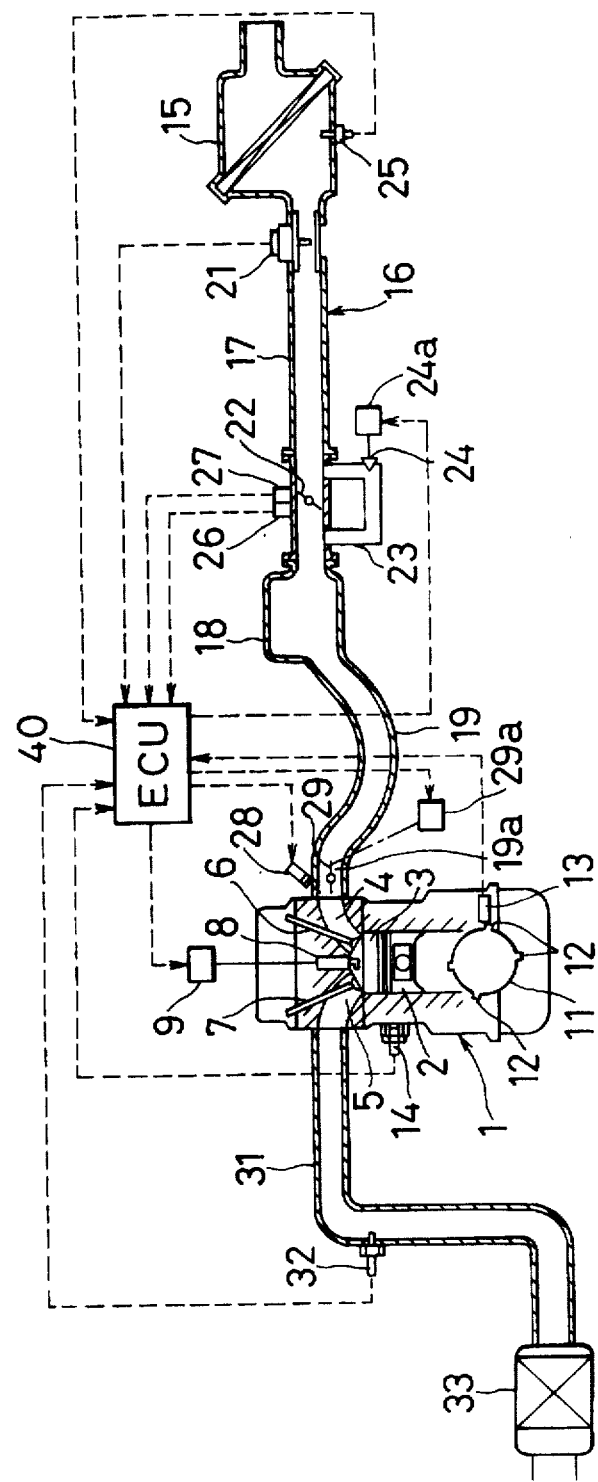
FIG. 1 is a schematic view of an engine which is provided with a control system in accordance with a preferred embodiment of the present invention.

FIG. 1 is a schematic view of an engine to which the present invention is applied. The engine is of a four cycle gasoline engine of a straight four cylinder which is provided with an engine body 1 and intake and exhaust systems therefor. Each cylinder of the engine body 1 is formed with a combustion chamber 3 above a piston 2. To the combustion chamber 3 are opened an intake port 4 and exhaust port 5 for which an intake valve 6 and exhaust valve 7 are provided. An ignition plug 8 is mounted on the engine body 1 to be oriented into the combustion chamber 8. The ignition plug 8 is connected to an ignition circuit 9 including an ignitor capable of electronic control of ignition timings.

At an end of a crank shaft of the engine body 1 are mounted a detection plate 11 with a predetermined number of projections 12 at a peripheral portion thereof. A crank angle sensor 13 comprising an electromagnetic pickup or the like is disposed corresponding to the peripheral portions of the plate 11. As the plate 11 rotates along with the crank shaft during the engine operation, a pulse signal is produced when the projection 12 passes through the crank angle sensor 13. The engine body 1 is provided with a coolant temperature sensor 14. The intake system of the engine is provided with an intake passage 16 for introducing an intake air from an air cleaner 15 to the engine body 1. The intake passage is formed a common intake passage 17, a surge tank 18 disposed downstream thereof and individual intake passages 19 from the surge tank 18 to the intake ports 4 of the cylinders respectively. In the common intake passage 17 are disposed an air flow meter 21, a throttle valve 22, Idling Speed Control(ISC) passage 23 bypassing the throttle valve 22 and ISC valve 24 for opening and closing the ISC passage. In addition, there are provided in the intake system, an intake gas temperature sensor 25, idle switch 26 for detecting an entire close condition and a throttle opening sensor 27 for detecting the throttle opening.

In the vicinity of a downstream end of the individual passages 19 are mounted injectors for injecting a fuel. The injector 28 opens for a time period corresponding to a pulse width based on a signal (injection pulse) from Electronic Control Unit (ECU) 40 to inject the fuel supplied by an oil pump (not shown) through an oil passage to the intake port 4. In order to improve the combustibly during the lean burn operation, it is preferred that the individual passage are divided into a primary passage (not shown) and a secondary passage 19a in the downstream thereof both which are opened to the port 4 and that a swirl control valve 29 is provided in the secondary passage 19a to be closed in the lean burn operation and the like to produce a swirl of the intake gas in the combustion chamber 3.

The exhaust system of the engine is provided with an exhaust passages 31 led to the exhaust ports 5 of each of the cylinders. In the exhaust passage 31 are provided a λO2 oxygen sensor 32 and catalytic converter 33 for cleaning the exhaust gas. The λO2 sensor detects Oxygen concentration (O2 concentration) output in the exhaust gas to obtain the A/F of the intake gas introduced to the combustion chamber 3 wherein the output of the O2 sensor is remarkably changed when the theoretical A/F is detected. The catalytic converter 33 may clean the emission such as Nox in the exhaust gas, preferably, could be effective even in the lean burn operating condition in which the A/F takes continuously a value such as more than 22 greater than the theoretical value, in other words, leaner intake gas mixture is continuously introduced to the combustion chamber 3.

Figure 2:
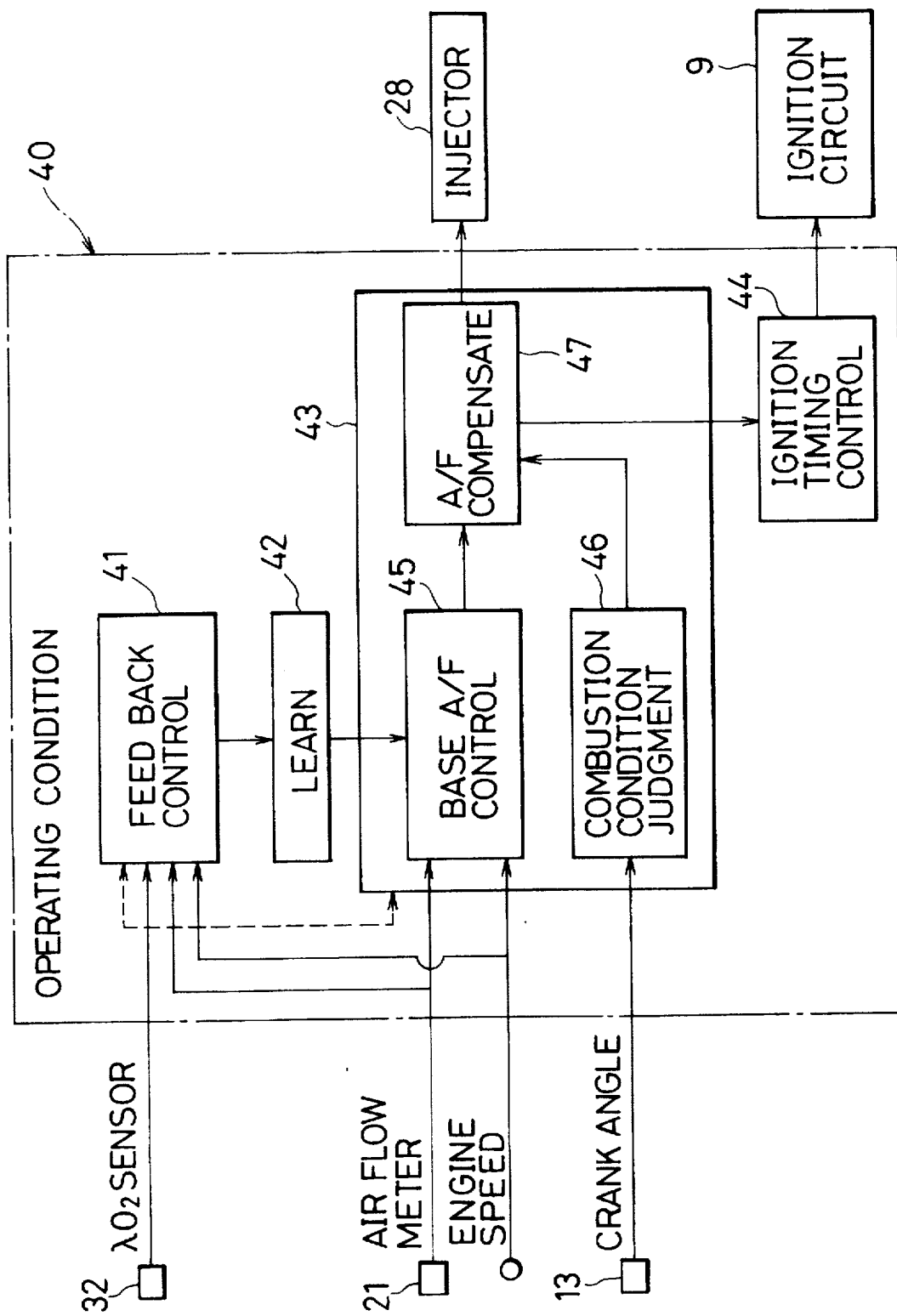
FIG. 2 is a block diagram of a control unit.
Figure 3:
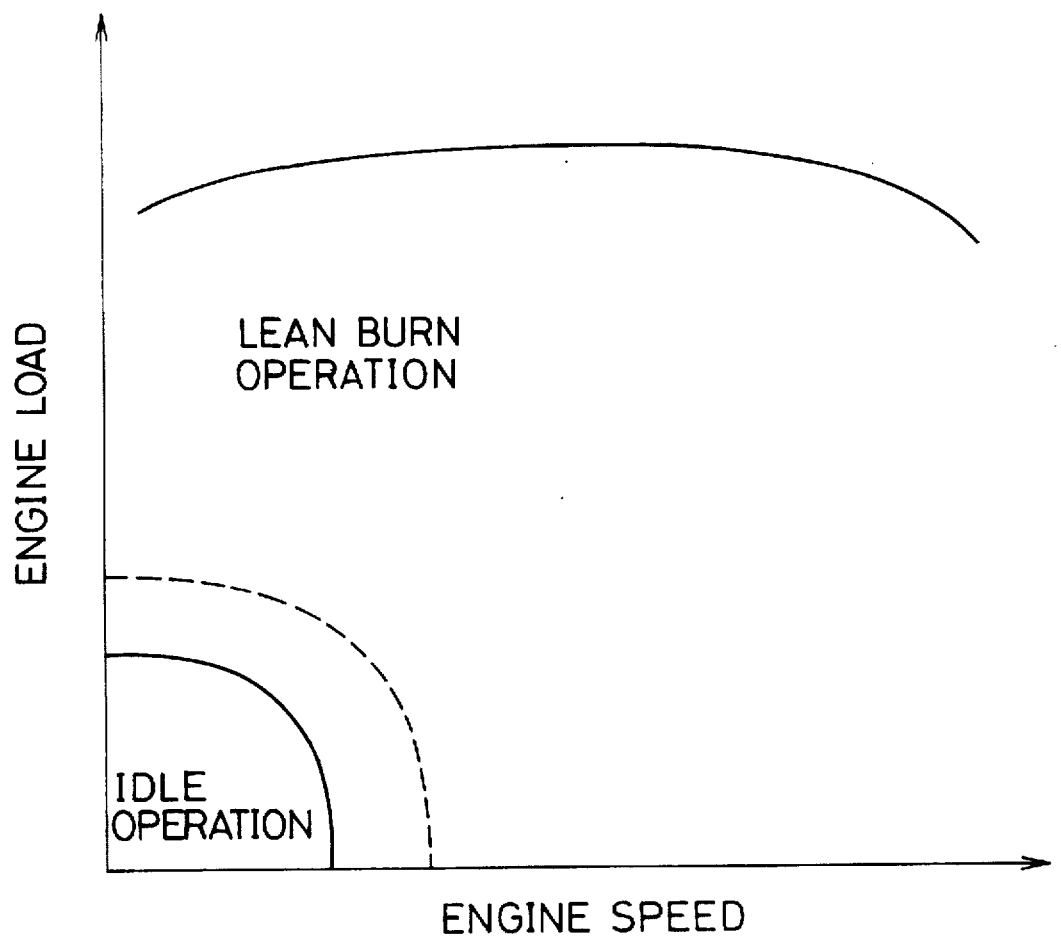
FIG. 3 is a map showing areas set for A/F control.

Numeral 40 is an Electronic Control Unit (ECU) for an engine control which is comprised of a microcomputer and the like. To the ECU 40 are introduced signals from the crank angle sensor 13, coolant temperature sensor 14, air flow meter 21, intake gas temperature sensor 25, idle switch 26, throttle opening sensor 27, λO2 sensor 32 and the like. The ECU 40 produces signals for controlling the injector 28 for the fuel injection, the ignition circuit 9 for the ignition timing, as well as signals to an actuator 24a of the ISC valve 24 and actuator 29a of the swirl control valve 29. The ECU 40, as shown in FIG. 2, is provided with feedback control element 41, learning element 42, lean A/F control element 43 and ignition control element 44. A lean operation area is defined as shown in FIG. 3 as a predetermined operation area excluding an idling operation area (for example, all the operation area other than the idling operation area). After an engine warm up operation, an A/F control is carried out in the idling operation area by means of the feedback control element 41 and in the lean operation area by means of the lean A/F control element 43. In a semi-warm up condition where the coolant temperature is between about 50° C. and 60° C. the A/F control is carried out by means of the A/F feedback control element 41 and a learning of the A/F control compensation value is carried out by means of the learning element.

The feedback control means 41 carries out the A/F feedback control in a manner that a feedback compensation value based on the λO2 sensor is added to a base fuel injection amount based on the output of the air flow meter and an engine speed so as to control the A/F to the theoretical A/F. The learning element 42 obtains the learning compensation value of the fuel injection amount or the A/F control gain based on the A/F feedback control during the semi-warm up condition.

The lean A/F control element 43 includes a base A/F control element 45, combustion condition determining element 46 and A/F compensation element 47 to provide the A/F with a value larger than the theoretical value or closer to the stable combustion limit.

The base A/F control element 45 sets an A/F in the vicinity of the stable combustion limit to determine a fuel injection amount corresponding to the set A/F based on the base fuel injection amount determined from the intake air amount and engine speed and the like and compensation coefficient and the learned compensation value through the learning control. The combustion condition determining element 46 determines combustion conditions of each of the cylinders based on an angular speed variation which is obtained based on an angular speed sensed by the crank angle sensor.

The A/F compensation element 47 compensates the fuel injection amount based on the determination of the combustion condition determining element 46 in a manner of making the intake gas mixture rich when a roughness or instability of the engine combustion condition is enhanced beyond a predetermined allowance or tolerance and making the intake gas mixture lean when the roughness is converged within the predetermined allowance.

The ignition timing control element 44 sets an ignition timing in accordance with the set A/F when the lean A/F control is being executed by the lean A/F control element 43 and compensates the set A/F in accordance with the compensation by the A/F compensation element 47 in a manner of compensating the ignition timing to be retarded when the intake gas mixture is made rich as a result of the compensation of the A/F control gain by the A/F compensation element 47 and to be advanced when the mixture is made lean as a result of the compensation of the A/F control gain.

Hereinafter, a preferred embodiment of the A/F control is explained taking reference with flow charts shown FIG. 4 through FIG. 6.

Figure 4:
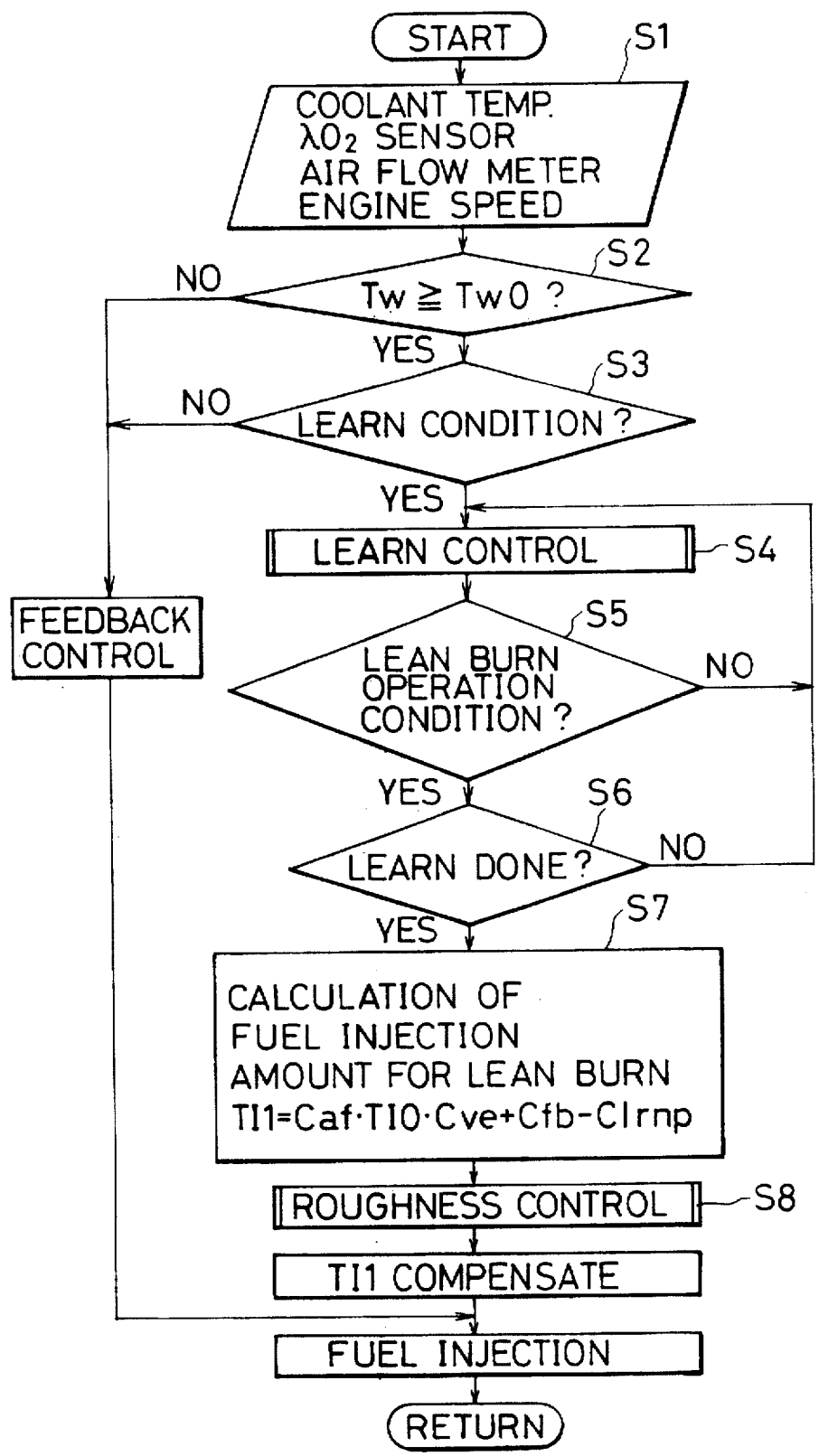
FIG. 4 is a flow chart of a main routine.

A main routine shown in FIG. 4 starts with, at first, reading the engine coolant temperature, $\lambda O2$ sensor output, air flow meter output, engine speed and the like (step S1). Next, it is judged whether or not the engine coolant temperature Tw is higher than a reference Tw0 (for example, 50° C.) denoting the semi-warmed up condition (step S2). When the engine coolant temperature Tw is higher than the reference Tw0, the feedback control for A/F is executed. Next, it is judged whether or not the conditions for the learning of the fuel injection are established (step S3). For example, where the engine operating condition is other than the idling operation area and where the A/F feedback control based on the output of $\lambda O2$ sensor is ready to be carried out, it is judged that the learning conditions are met and then the procedure is transferred step S4 to carry out the learning control.

Figure 5:
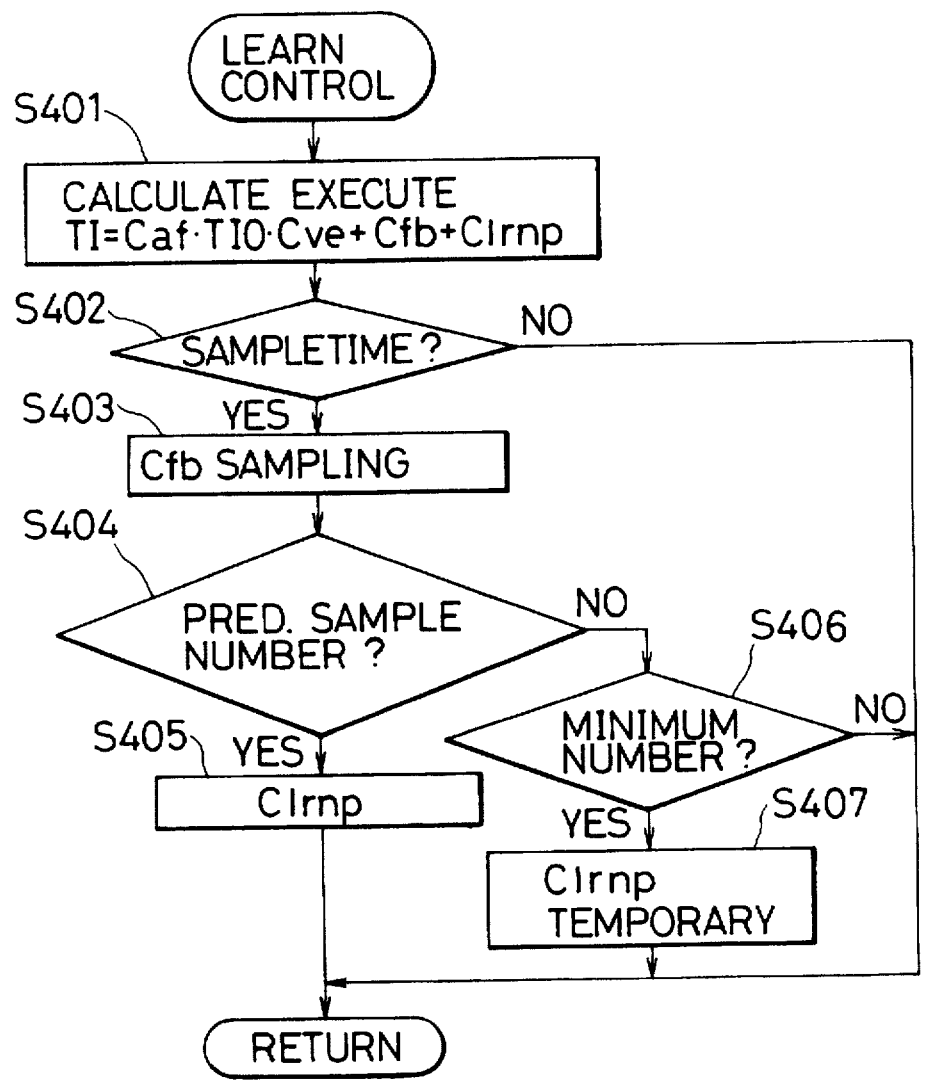
FIG. 5 is a flow chart of a routine showing a learning control.
Figure 11:
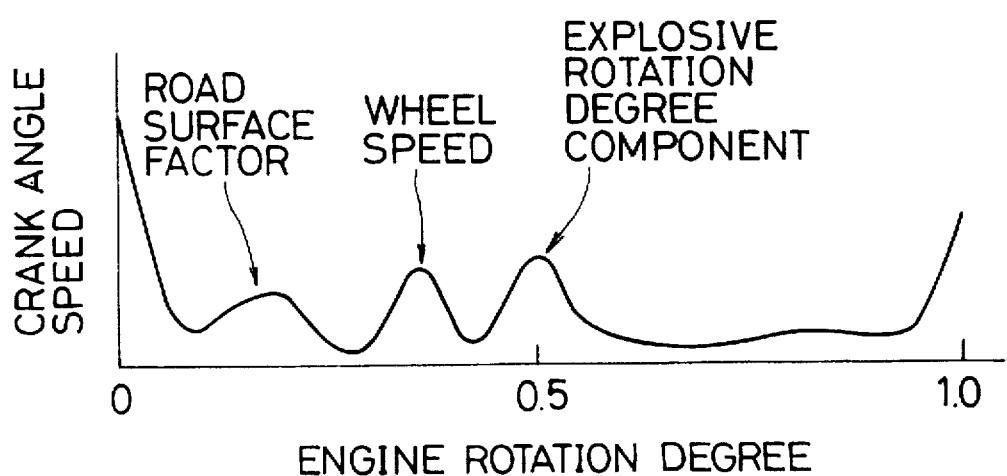
FIG. 11 is a view showing a crank angle speed fluctuation due to noise factor.
Figure 12:
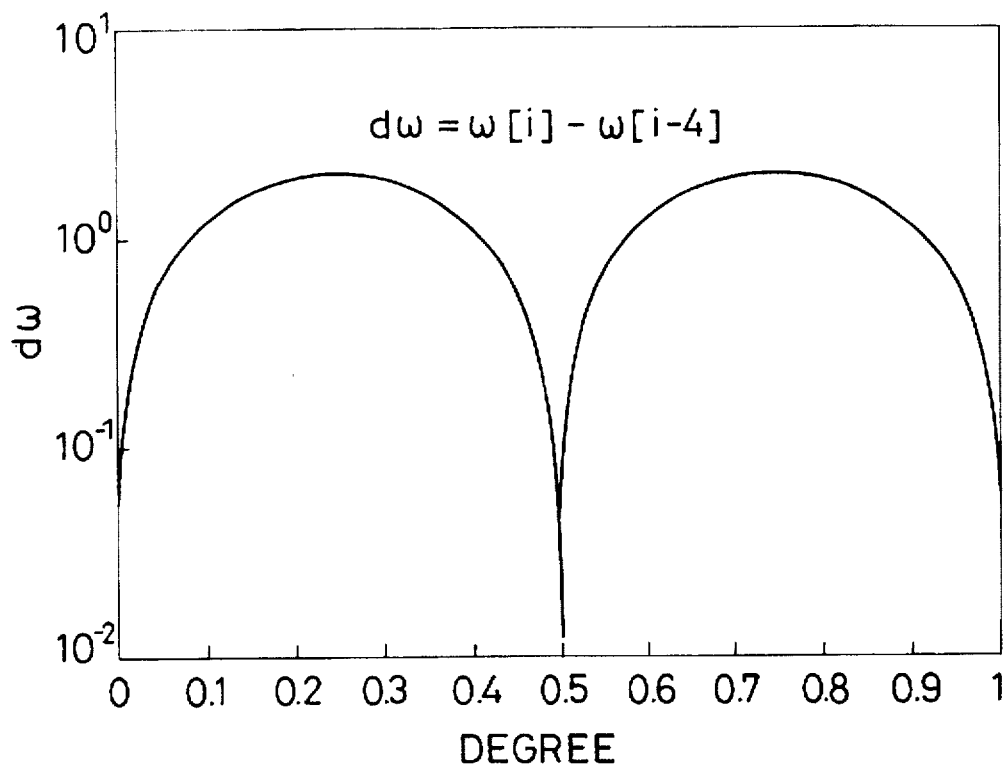
FIG. 12 is a view showing data after removing frequency component having 0.5 degree of the engine rotation and natural number times thereof from the crank angle detected data.
Figure 13:
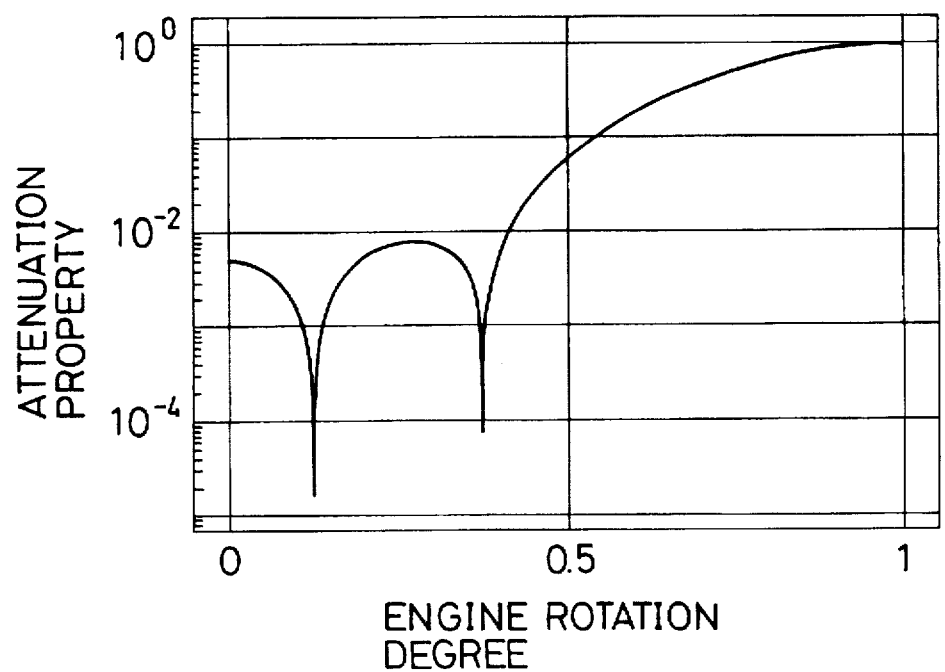
FIG. 13 is a view showing data after removing frequency component lower than 0.5 degree of the engine rotation using a high-pass filter.

In the learning control, as shown in FIG. 5, the fuel injection amount TI is calculated in accordance with the following formula.

$$TI=Caf*TI0*Cve+Cfb+Clrnp$$

wherein TI0 is a base fuel injection amount based on the operating condition, for example, obtained from the intake air amount and engine speed;

Caf is an A/F compensation coefficient (in this embodiment, Caf=1 corresponding to the theoretical A/F);

Cve is a volumetric efficiency compensation coefficient (described in detail later);

Cfb is a feedback compensation value corresponding to the $\lambda O2$ sensor output; and Clrnp is a learned compensation value (where the learning control has not been done, the value of Clrnp=0). The fuel injection is done with the calculated value TI (step S401). In FIG. 11, the feedback compensation value Cfb is sampled at a predetermined sampling time (step S402, S403). Where the sampling number reaches the predetermined number, for example 16, the value of Clrnp is calculated from a mean value of the sampled values of the feedback compensation values Cfb to be stored in a memory (step S404 and S405). In this case, where the sampled number exceeds a minimum effective number (for example 4) smaller than the predetermined sampling number, a temporary leaned compensation value Clrnp may be calculated (step S406, S407).

Figure 7:
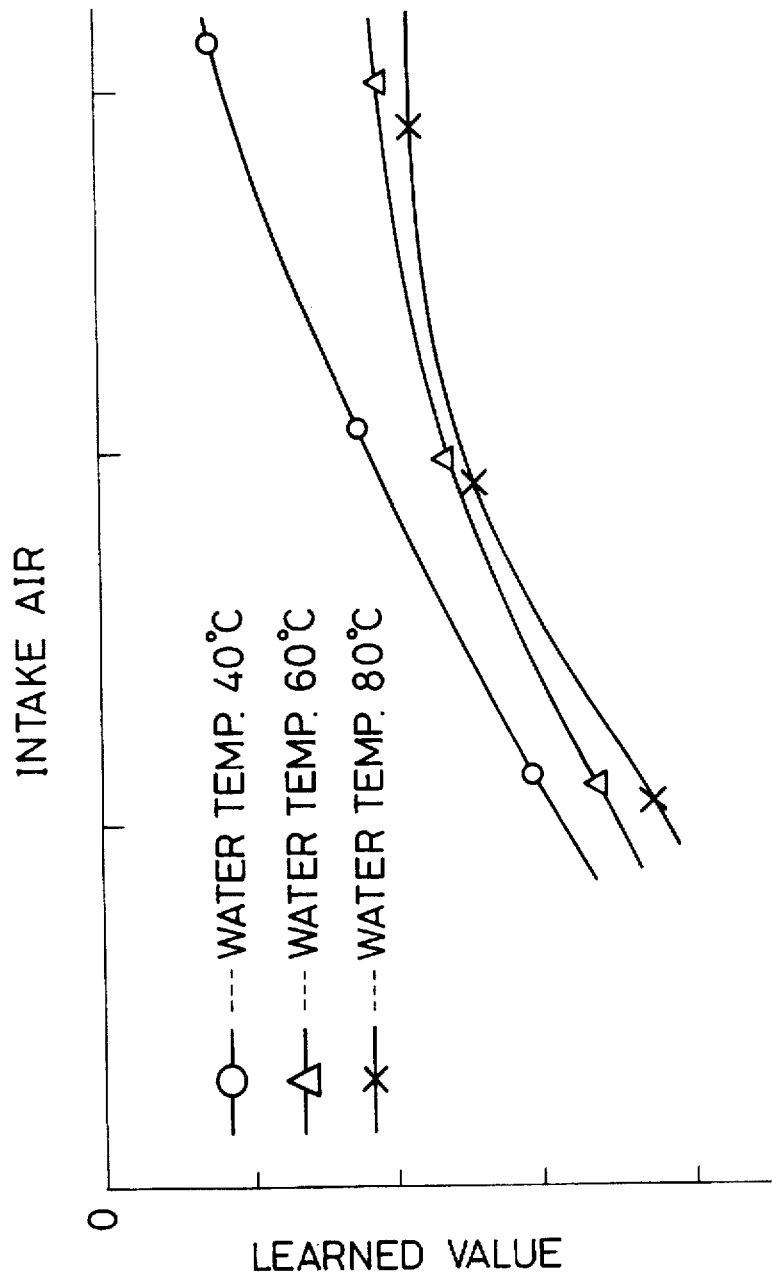
FIG. 7 is a characteristic view showing an influence of a coolant temperature to a learned value.

In this manner, the learning control is carried out before the engine reaches the warmed up condition. In this case, the coolant temperature affects the learning compensation value Clrnp. For example, where the coolant temperature is extremely low, the learned compensation values are greatly deviated from the ones obtained under the warmed up condition or substantially warmed up condition where the coolant temperature is close enough to the warmed up condition. As a result, the learned compensation value is not reliable in the case of undue low coolant temperature condition. In view of this, the learning control will not be carried out where the coolant temperature Tw is lower than the reference value Tw0 or where the engine operating condition has not reached the semi-warmed up condition yet. Preferably, the learned compensation value Clrnp may be compensated based on the dependency of the coolant temperature as shown in FIG. 7 during the learning control.

In FIG. 4, in step S5, it is judged whether or not the lean burn operating conditions are met. In this judgment, for example, it is judged that the lean burn operating conditions are met where the coolant temperature is higher than a predetermined temperature, for example 60° C. and where the operating condition is in the lean burn operating area. Where the lean burn operating conditions are met in step S5, it is judged whether or not the learning control has been done by judging whether or not at least the temporary learned compensation value Clrnp is obtained through the learning control in step S6 (S407 in FIG. 5). Where either the judgment in step S5 or in step S6 is No, the procedure is returned to the step S4. On the other hand, where both the judgments in step S5 and S6 are Yes, the fuel injection amount TI1 as a preferred embodiment of the A/F control gain is calculated to accomplish a predetermined A/F or target A/F which provides a leaner intake gas mixture than that under the theoretical A/F by the following formula and executed at a predetermined timing (step S7).

$$TI1=Caf*TI0*Cve+Cfb+Clrnp$$

wherein Caf is smaller than 1 for a predetermined leaner intake gas mixture of A/F;

Cfb is 0;

and Clrnp is a value obtained through the learning control (step S4) and stored in the memory which is learned compensation value. Thus, the learned value Clrnp is used for the calculation of a control gain of the fuel injection amount during the lean burn operation so that the A/F control in the lean burn operation is carried out not based on the output of linear O2 sensor and the variations of the fuel injection amount depending on the respective injectors are compensated based on the result of the learning control to accomplish an appropriate fuel injection control.

In the above formula, the volumetric compensation coefficient Cve is used for compensate the deviation of a true volumetric efficiency from a gross volumetric efficiency based on the output of the air flow meter, namely the difference between the value calculated based on the output of the air flow meter and an actual amount of the intake air introduced to the engine. The difference between the calculated value and the true value of the intake air amount relates to the engine property and changes depending on the operating area. Thus, the volumetric compensation coefficient Cve are predetermined based on experimental data for every operating condition and stored in the memory as a map configuration. The specific value of the volumetric compensation coefficient Cve is determined in light of the map depending on the operating condition.

The compensation based on the coefficient Cve in accordance with the operating condition is made where the fuel injection amount is calculated during the learning control. Thus, an error due to the change of the operating condition in the fuel injection amount is compensated by the volumetric compensation coefficient so that the learned compensation value is not substantially changed depending on the operating condition. Accordingly, it is not necessary to calculate the learning compensation value as the operating condition changes. As a result, the learned compensation value obtained in a certain operating condition can be used effectively in calculating the fuel injection amount in the lean burn operation even though it has been obtained through the learning control other than the lean burn operation.

Figure 6:
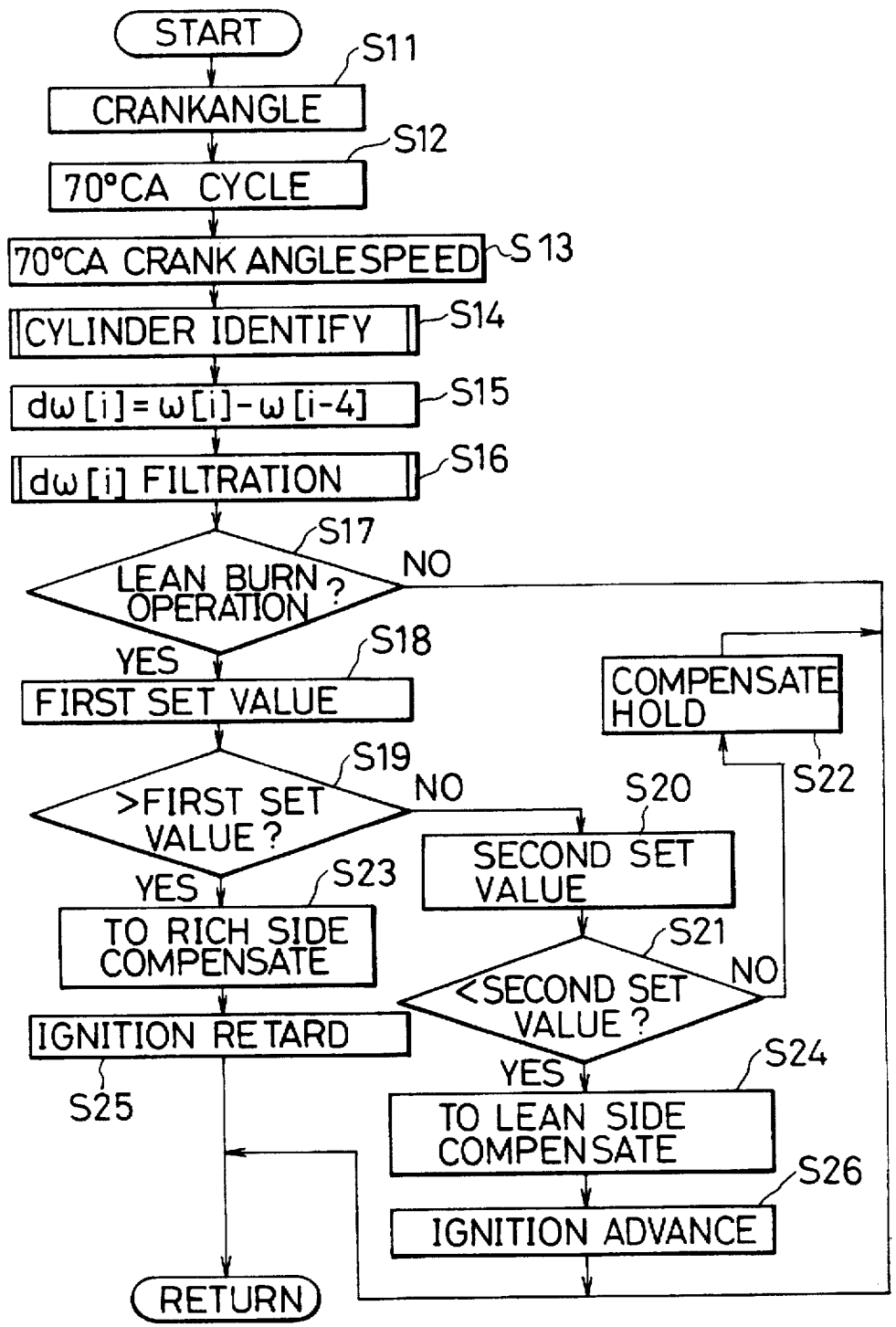
FIG. 6 is a flow chart of a routine showing a roughness control.

Next, in step S8, the roughness control is carried out, specifically, the roughness control is executed in accordance with the procedure as shown in FIG. 6.

In FIG. 6, the crank angle signal from the crank angle sensor is introduced (step S11). A period or cycle of the crank shaft rotation is calculated based on the periodical detection of the crank angle signals(step S12) and the angular speed ω of the crank shaft is calculated (step S13).

Hereinafter, a manner for effectively and accurately detecting the crank angle speed ω will be described taking reference with FIGS. 8 and 9.

Figure 8:
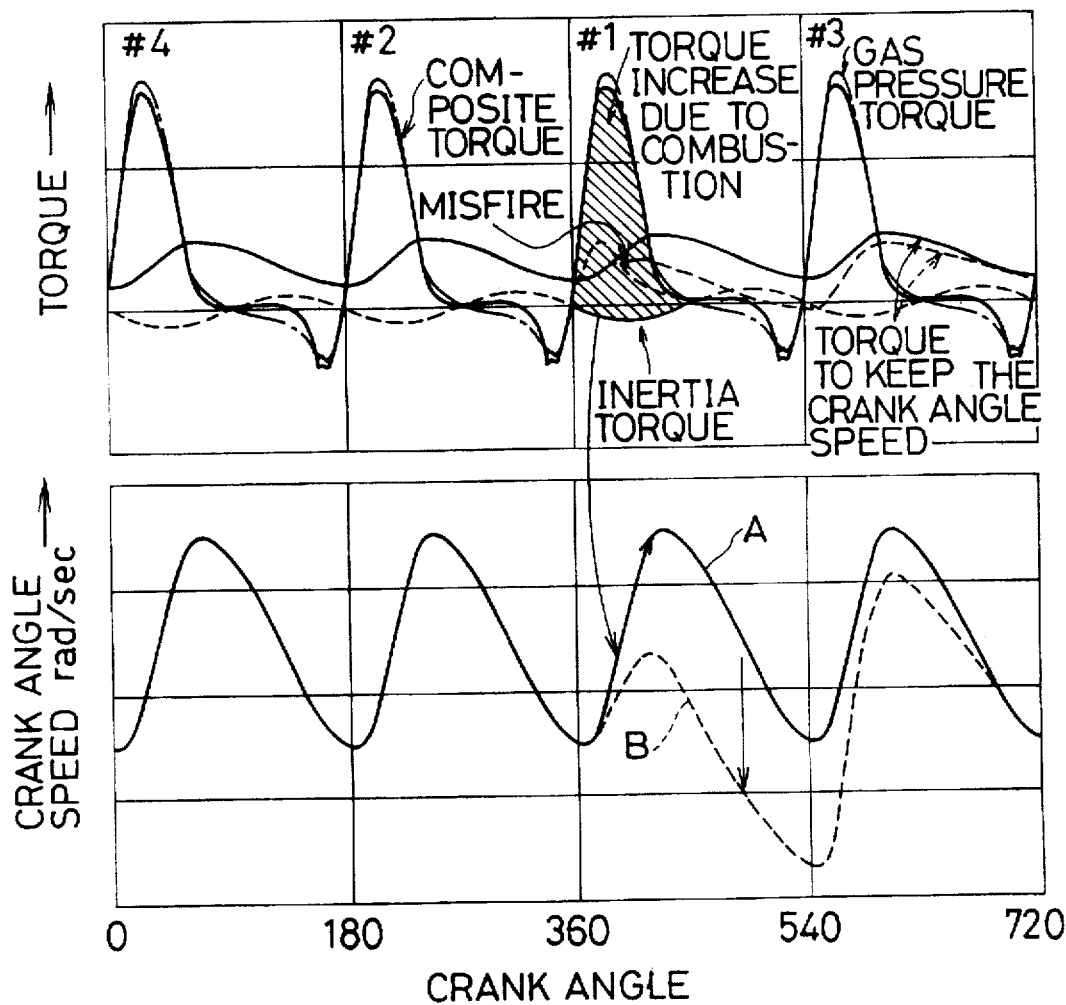
FIG. 8 is an illustrative view showing changes of four cylinder 4 cycle engine stroke, torque, and crank angle speed.

FIG. 8 shows that changes of engine output torque and the crank angle speed ω with a crank angle in the abscissas. A composite torque of gas pressure torque and inertia torque change as shown by a thick real line in normal combustion. The crank angle speed ω changes as shown by a real line A in the normal combustion in which the crank angle speed ω increases as a combustion pressure increases after the ignition and then decreases as the combustion is completed. On the other hand, when an ignition failure or a misfire occurs in No.1 cylinder, the crank angle speed ω changes as shown by a broke line B in which the crank angle speed ω remarkably decreases in the middle of expansion stroke as the combustion pressure is reduced so that the difference of the crank angle speed w between the normal combustion and the misfire is increased. In the next cylinder (No.3), the crank angle speed ω is still slow in the first half of the expansion stroke due to the influence of the misfire of the precedent cylinder (No.2). However, the crank angle speed ω recovers toward a normal value as the stroke is advanced.

Figure 9:
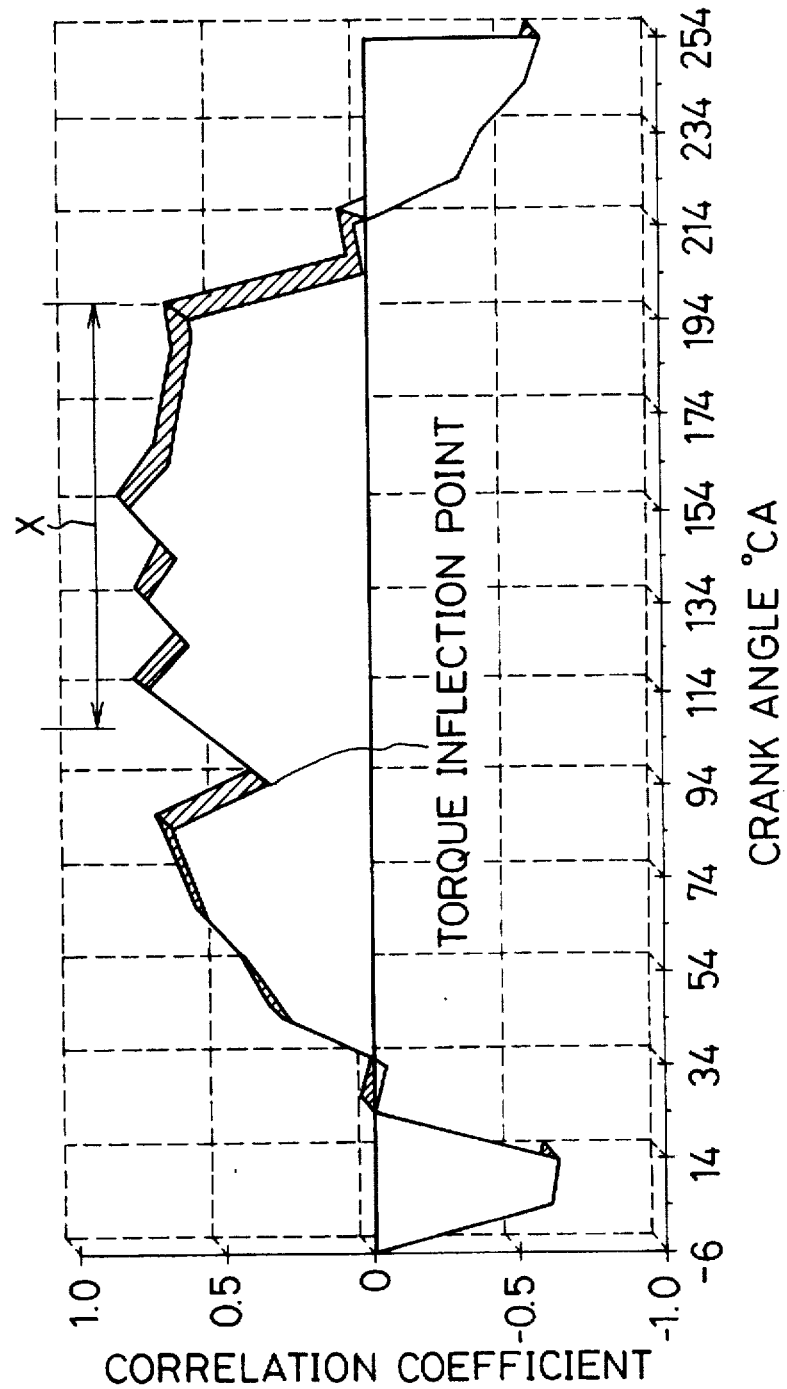
FIG. 9 is an illustrative view showing between a combustion pressure and crank angle change profile.
Figure 10:
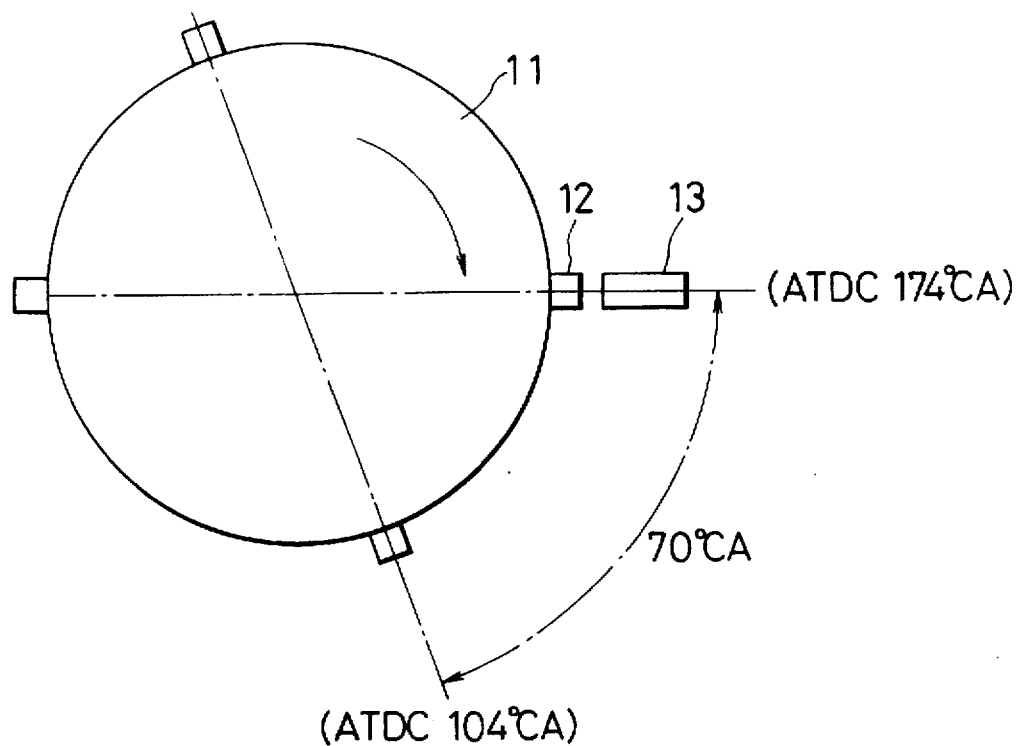
FIG. 10 is a view showing a detection plate for a crank angle and crank angle sensor.

FIG. 9 shows a relationship between the combustion pressure and the change in the crank angle speed ω wherein the abscissas shows the crank angle speed ω with the compression stroke top dead center being 0° in a cylinder and the ordinates is a correlation coefficient. The correlation coefficient is defined as a degree of influence of the combustion condition (combustion pressure) to the crank angle speed ω. If the value of the correlation coefficient is positive, the correlation between the combustion pressure profile and the crank angle speed ω profile is remarkable in a specific cylinder. If this value is negative, this means that the combustion pressure profile in the precedent cylinder greatly influences the crank angle speed ω profile compared with the current cylinder.

As seen from FIGS. 8 and 9, the correlation between the combustion pressure profile and the crank angle speed ω profile is remarkable from a substantial end of the combustion (about ATDC 40° CA) to a substantial start of the combustion of the next cylinder (about ATDC 200° CA). Specifically, after the reduction of the gas pressure torque and the experience of torque inflection point (about ATDC 90° CA), the correlation coefficient becomes remarkable in a period X (ATDC 100° CA to ATDC 200° CA) wherein the inertia torque is increased. Therefore, if the crank angle speed ω is detected during the period of ATDC 40° CA to ATDC 200° CA, in particular, during the period of ATDC 100° CA to ATDC 200° CA, the accuracy of the detection of the variations of the crank angle speed ω can be improved so that the judgment of the combustion conditions of the cylinders as to whether or not the misfire occurs can be made reliably as well. It is preferred that the crank angle detection span is greater than 60° CA so as to keep a sufficient detecting period for the crank angle even in middle speed and high speed conditions.

In view of this, arrangements of the projections 12 in the plate 11 and the crank angle sensor 13 are so determined as to detect the crank angle of ATDC 104° CA and ATDC 174° CA. The crank angle speed ω for 70° CA in the detection points set covering the above range of ATDC 104° CA and ATDC 174° CA is calculated.

Following the step S13 of detection of the crank angle speed ω, the determination of the cylinders are made. Thereafter, the procedure following the step S15 is executed for each of the cylinders. For each of the cylinders, the change in the crank angle speed ω is obtained by excluding noise from the above crank angle data.

As noise factors producing a crank angle speed fluctuation other than the change in the combustion condition, there are crank angle speed variations based on an influence of resonance due to the explosive combustion as a vibration source, wheel rotation due to imbalance of wheel and drive system thereof, vibration acting from a road surface to a tire and the like. As shown in FIG. 11 the noise of the explosive rotation degree component due to the influence of the resonance is produced in a cycle of 0.5 degree of the engine rotation speed and by times of natural number thereof, the noise of the explosive rotation degree component due to the influence of the resonance is produced in a cycle of 0.5 degree of the engine rotation speed and by times of natural number thereof. In the four cycle engine, one cycle of the engine output torque change corresponds to two rotations of the crank shaft, where the torque change of the crank shaft is expressed with Fourier series, the first term of the harmonic series is 0.5 degree, followed by 1 degree, 1.5 degree and the like as second and third terms and the like (wherein a harmonic term having one cycle for one crank shaft rotation is one degree). This is because the four cycle engine have one cycle for two crank shaft rotation. The noises due to the influence of the wheel rotation imbalance and due to the influence of road surface are produced in frequency components lower than 0.5 degree of the engine rotation speed.

In view of this, certain frequency components of 0.5 degree of the engine rotation speed and times of natural number thereof is removed from the crank angle data obtained and the crank angle speed change profile is obtained. specifically, the deviation dω[i] of the crank angle speed between the current value ω[i] and the previous value ω[i-4] in the precedent cycle with regard to the same cylinder is calculated (step SIS). As a result, the frequency components of 0.5 degree of the engine rotation speed and natural number times thereof is removed from the crank angle data detected. In addition, the detected data is processed by a high-pass filter (For example, FIR type rotation synchronous digital filter) to reduce the noise component lower than the frequency of 0.5 degree of engine rotation speed sufficiently.

Following the step S16 of FIG. 6, it is judged whether or not the operation area is in the lean burn operating area. Where the operating area is in the lean burn operating area, the A/F is compensated based on the roughness (the crank angle speed variation) as operation of the A/F compensation element 47 in steps S18 through S21. Namely, a first set value denoting a roughness limit is determined and it is judged whether or not the roughness exceeds the first set value (steps S18, S19). If the roughness is not greater than the first set value, a second set value smaller than the first set value by a certain value is determined and it is judged whether or not the roughness is smaller than the second set value (steps S20, and S21). The above first and second set values are stored in a map in connection with the operating condition. If the roughness is in a dead zone between the first and second set values, the fuel injection compensation value in accordance with the roughness is held (step S22). On the other hand, if the roughness exceeds the first set value, the fuel injection amount(TI1) is compensated to make the intake gas mixture rich by a predetermined value (fuel injection increase) (step S23). On the other hand, if the roughness is smaller than the second set value, the fuel injection amount (TI1) is compensated to make the intake gas mixture lean by a predetermined value (fuel injection reduction) (step S24).

Figure 14:
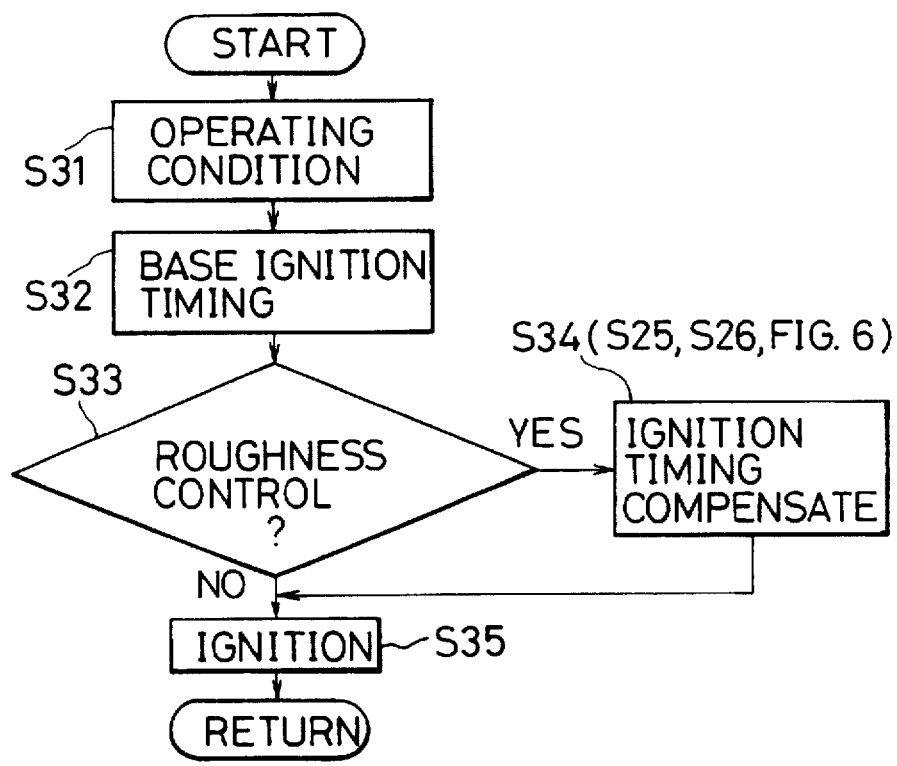
FIG. 14, is a flow chart of a routine for an ignition timing control.

As an operation of the ignition timing control element 44, the ECU executes a subroutine as shown in FIG. 14 at a predetermined interval, for example, for every predetermined crank angle. In this procedure, the operating condition is detected (step S31). The base ignition timing is determined in accordance with the target or predetermined A/F which is determined based on the engine operating condition(step S32). For example, the base ignition timing TI0 has a different value between the engine operation with the theoretical A/F and with the leaner intake gas mixture than that under the theoretical A/F. It is judged whether or not the roughness control has been done (step S33). The ignition timing is compensated corresponding to the A/F compensation in accordance with the procedures as shown in the steps S25 and S26 of FIG. 6 when roughness control has been done(step S34). Then, the ignition is executed (step S35). In this case, where the fuel injection amount is compensated to make the intake gas mixture rich, the ignition timing is retarded (step S25). Where the fuel injection is compensated to make the intake gas mixture lean, the ignition timing is advanced (step S26).

According to the control system in accordance with the present invention, in the lean burn operating condition after the warm up operation, the fuel injection amount is calculated for a predetermined lean intake gas mixture of A/F close to the stable combustion limit. In this case, the learned compensation value Clrnp obtained through the learning control (step S4 in FIG. 4). The volumetric compensation coefficient Cve is also introduced for compensation so as to calculate properly the fuel injection amount for the lean intake gas mixture of the A/F (target A/F).

A certain situation would occur that the combustion is unstable as result the engine operation is beyond the stable combustion limit even though the engine is operated with the predetermined lean intake gas mixture of A/F. In this situation, according to the present invention, the fuel injection amount(step S23 and S24) as well as the ignition timing (step S25 and S26) are compensated corresponding to the roughness of the combustion stability.

Namely, as shown in FIG. 14, where the roughness is greater than the first set value, the fuel injection amount is compensated to make the intake gas mixture rich to improve the combustion stability until the roughness is reduced smaller than the first set value. Concurrently, the ignition timing is retarded in accordance with the compensation of the fuel injection amount. On the other hand, where the roughness is smaller than the second set value, the fuel injection amount is compensated to make the intake gas mixture lean until the roughness is reduced greater than the second set value. Concurrently, the ignition timing is compensated to be advanced.

Through the above control of the fuel injection, the A/F is controlled so that the roughness is effectively controlled within the predetermined allowance between the first and second set values. This control is done on each of the cylinders so that the A/F is control to have as larger value as possible or the intake gas mixture is controlled as leaner as possible provided that the combustion condition of the engine is not deteriorated unduly. As a result, the fuel consumption efficiency can be improved and Nox is reduced by virtue of the leaner control of the intake gas mixture through the A/F control. Thus, the emission performance of the engine is improved. In this case, even if the A/F is changed due to the compensation of the fuel injection in response to the roughness control, the ignition timing is compensated to be optimized. As a result, the emission performance is improved in this respect.

Figure 15:
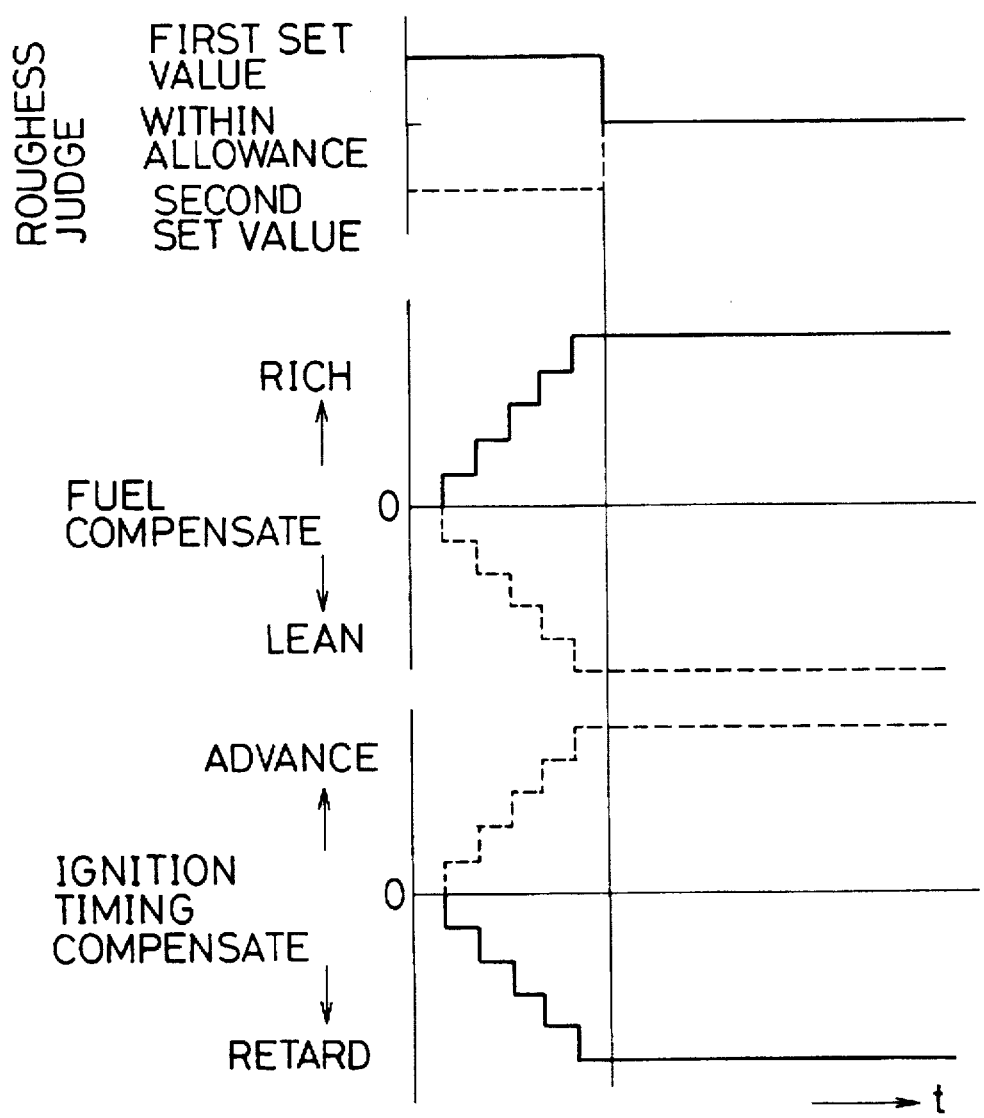
FIG. 15 is a graphical representation of changes of compensation values of the fuel injection amounts and ignition timing compensation values in response to the roughness control.
Figure 16:
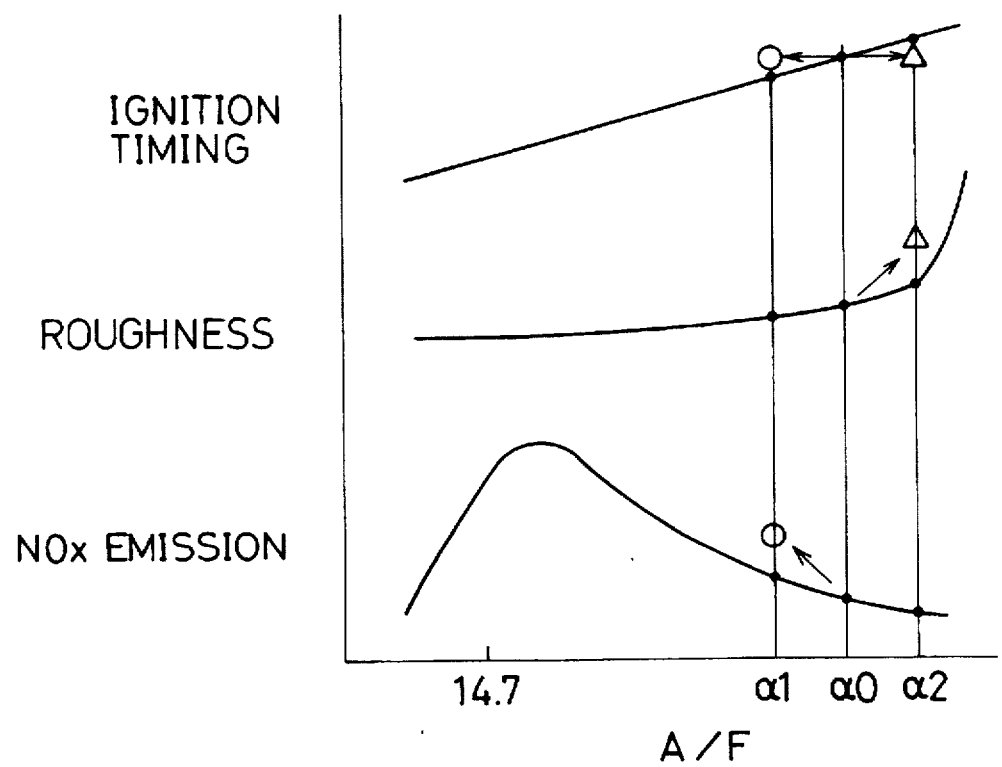
FIG. 16 is a graphical representation of a relationship between the ignition timing, roughness and Nox emission amount.

As shown in FIG. 15, there is a relationship among the A/F, roughness and Nox emission. The optimized ignition timing is retarded as the A/F increases or the intake gas mixture is leaner. During the lean burn operation, the base fuel injection amount (fuel injection calculated in step S7 in FIG. 4) is determined to accomplish a leaner A/F α0 (providing a leaner intake gas mixture) and the base ignition timing is set at the optimized ignition timing in the leaner A/F α0. However, if the A/F is changed to a rich side to make the intake gas rich (α1 side) due to the roughness control, the ignition timing would result in being advanced as shown in FIG. 15 by small circle compared with the optimized timing at the changed A/F. As a result, the Nox emission increases. On the other hand, if the A/F is changed to a leaner side (α2), the ignition timing would result in being retarded as shown by a triangle compared with the optimized timing to deteriorate the combustion stability.

Thus, according to the present invention, the ignition timing is concurrently compensated with the compensation of A/F to reduce Nox as low as possible and to improve the combustion stability. This means that the stable combustion limit based on the A/F control is enhanced the through the control of the present invention. Thus, the combination of the ignition timing control with the control for compensating the fuel injection in accordance with the roughness can synergistically affect to improve the leaner A/F, fuel consumption efficiency and emission performance.

The present invention is not limited to the above embodiment but many modification and variations can be made.

For example, although the above control is made on each of the cylinders so as to compensate the fuel injections in accordance with the roughness as well as the compensation of the ignition timing, the ignition timings for all the cylinders can be commonly compensated based on the mean value of the compensation values of the fuel injection amounts in accordance with the roughness for the respective cylinders. Alternatively, in addition to the common compensation for all the cylinders, the ignition timing of each of the cylinders can be individually compensated based on the deviations of the A/F control gains for the individual cylinders from the mean value of all the cylinders.

Preferably, the factors or parameters of the variations between the individual cylinders in the fuel injection compensation values in response to the roughness control are analyzed to be accounted for the compensations of the ignition timings for the individual cylinders. In this case, the compensation of the ignition timing may be made for all the cylinders commonly, alternatively, the compensation is made individually for each of the cylinders. Further, the combination thereof may be employed.

In detail, As factors of the variations in the compensation values of fuel injection amounts, there are variations in the combustion conditions between the cylinders and variations of the fuel injection properties through the injectors 28 for the respective cylinders. If the former factor is dominant, the ignition timing is preferably compensated for the respective cylinders individually in response to the individual compensations of the fuel injection amounts because the individual compensation for the fuel injection amounts produce the variations in the A/F for the respective cylinders. On the other hand, if the latter is dominant, it is preferred that the ignition timings are commonly compensated for all the cylinders because the variations in the injection properties of injectors 28 are equalized between the cylinders due to the compensations of the fuel amounts for the individual cylinders.

Therefore, if the variations of the fuel injection properties of the injectors 28 are remarkable, it is preferred that the compensation of the ignition timing is commonly compensated. If the variations thereof are small enough, preferably, the ignition timings are compensated individually for each of the cylinders. Further, it is preferred that a correlation between the variations of the fuel injection properties of the injectors 28a and the variations the combustion conditions of the cylinders are analyzed to make a compensation of the ignition timing individually in addition to the common compensation therefor.

In the above embodiment as shown in FIGS. 4 and 5, the learned value obtained through the learning control in the semi-warmed up condition is used for the fuel control in the various operating area. However, the learned value tends to be changed in a condition of a low intake gas amount in the vicinity of the idle operating area, thus, it is preferable that the learned value is not used for other operating area in the case of low intake gas amount area as shown by a broken line in FIG. 3.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. An engine control system in which an air fuel ratio is controlled to a target value providing a leaner intake gas mixture close to a stable combustion limit than that of a theoretical air fuel ratio under a predetermined operating range, comprising;

base air fuel ratio control means for setting a base air fuel ratio control gain so as to accomplish a predetermined air fuel ratio greater than the theoretical air fuel ratio during a control in said predetermined operating range;

combustion condition judging means for judging a combustion condition of each of cylinders of the engine, air fuel ratio compensating means for compensating the base air fuel control gain based on the judgment by the combustion condition judging means to accomplish the target air fuel ratio close to the stable combustion limit; and, ignition timing control means for setting a predetermined ignition timing corresponding to said predetermined air fuel ratio and for compensating said predetermined execution ignition timing taking account of the compensation of the air fuel ratio control gain by the air fuel ratio compensating means to obtain a final ignition timing.

2. An engine control system as recited in claim 1 wherein the base fuel air fuel control gain is amended to determine a final air fuel control gain to accomplish the target air fuel ratio.

3. An engine control system as recited in claim 1 wherein the base air fuel control means sets a base fuel injection amount as the base air fuel control gain and the air fuel ratio compensating means compensates the base air fuel ratio control gain.

4. An engine control system as recited in claim 1 wherein the improvement further includes an air fuel sensor for detecting the theoretical air fuel ratio;

feedback control means for carrying out a feedback control for an air fuel ratio based on output of the air fuel sensor when the engine is to be operated under a predetermined operating condition with the theoretical air fuel ratio;

learning control means for obtaining a learned value of the fuel injection amount under said predetermined operating condition through a learning control; and, the base air fuel ratio control means setting the base fuel injection amount in accordance with the target air fuel ratio taking account of the learned value of the air fuel ratio.

5. An engine control system as recited in claim 1 wherein the base air fuel compensation means compensates the base fuel injection amount based on the judgment of the combustion judging means to make the intake gas mixture rich when the combustion condition is unstable beyond a predetermined allowance, and to make the intake gas mixture lean when the combustion condition is stable within the predetermined allowance.

6. An engine control system as recited in claim 2 wherein the base air fuel compensation means compensates the base fuel injection amount based on the judgment of the combustion judging means to make the intake gas mixture rich when the combustion condition is unstable beyond a predetermined allowance, and to make the intake gas mixture lean when the combustion condition is stable within the predetermined allowance.

7. An engine control system as recited in claim 1 wherein the ignition timing control means compensates the ignition timing to be retarded when the air fuel ratio compensation means compensates the air fuel ratio to make the intake gas mixture rich, while the ignition timing to be advanced when the air fuel ratio compensation means compensates the air fuel ratio to make the intake gas mixture lean.

8. An engine control system as recited in claim 2 wherein the ignition timing control means compensates the ignition timing to be retarded when the air fuel ratio compensation means compensates the air fuel ratio to make the intake gas mixture rich, while the ignition timing to be advanced when the air fuel ratio compensation means compensates the air fuel ratio to make the intake gas mixture lean.

9. An engine control system as recited in claim 1 wherein the air fuel compensation means compensates the base fuel injection amount individually for each of cylinders and wherein the ignition timing control means compensates the ignition timing individually for each of the cylinders in response to the compensation of the base fuel injection amount.

10. An engine control system as recited in claim 1 wherein the air fuel compensation means compensates the base fuel injection amounts individually for each of cylinders and wherein the ignition timing control means compensates the ignition timing for all the cylinders commonly based on a mean compensation value of the fuel injection amounts for the individual cylinders.

11. An engine control system as recited in claim 1 wherein the air fuel compensation means compensates the base fuel injection amounts individually and wherein the ignition timing control means compensates minutely the fuel injection amounts of the individual cylinders in addition to the common compensation based on a mean compensation value of the fuel injection amounts for the individual cylinders.

12. An engine control system in which an air fuel ratio is controlled to a target value providing a leaner intake gas mixture close to a stable combustion limit than that of a theoretical air fuel ratio under a predetermined operating range, comprising:

operating condition detecting means for detecting an engine operating condition, fuel injection amount setting means for setting a base fuel injecting amount to accomplish a predetermined air fuel ratio greater than a theoretical air fuel ratio in a predetermined engine operating condition, combustion condition judging means for judging a combustion condition in at least one cylinder, fuel injection amount compensation means for compensating the base fuel injection amount based on the combustion condition in the cylinder so as not to misfire, ignition timing setting means for setting a predetermined ignition timing based on said predetermined air fuel ratio in the predetermined operating condition, and, ignition timing compensating means for compensating said predetermined ignition timing based on the compensation of the base fuel injection amount so as to keep away from misfiring in the cylinder.

13. An engine control system in which an air fuel ratio is controlled to a target value providing an intake gas mixture close to a stable combustion limit under a predetermined operating range, comprising;

base air fuel ratio control means for setting a base air fuel ratio control gain so as to accomplish a predetermined air fuel ratio during a control in said predetermined operating range;

combustion condition judging means for judging a combustion condition of each of cylinders of the engine, air fuel ratio compensating means for compensating the base air fuel control gain based on the judgment by the combustion condition judging means to accomplish the target air fuel ratio close to the stable combustion limit; and, ignition timing control means for setting a predetermined ignition timing corresponding to said predetermined air fuel ratio and for compensating said predetermined ignition timing taking account of the compensation of the air fuel ratio control gain by the air fuel ratio compensating means to get a final ignition timing.

14. An engine control system as recited in claim 13 wherein the base fuel air fuel control gain is amended to determine a final air fuel control gain to accomplish the target air fuel ratio.

15. An engine control system as recited in claim 13 wherein the base air fuel control means sets a base fuel injection amount as the base air fuel control gain and the air fuel ratio compensating means compensates the base air fuel ratio control gain.

16. An engine control system as recited in claim 13 wherein the improvement further includes an air fuel sensor for detecting the theoretical air fuel ratio;

feedback control means for carrying out a feedback control for an air fuel ratio based on output of the air fuel sensor when the engine is to be operated under a predetermined operating condition with the theoretical air fuel ratio;

learning control means for obtaining a learned value of the fuel injection amount under said predetermined operating condition through a learning control; and, the base air fuel ratio control means setting the base fuel injection amount in accordance with the target air fuel ratio taking account of the learned value of the air fuel ratio.

17. An engine control system as recited in claim 13 wherein the base air fuel compensation means compensates the base fuel injection amount based on the judgment of the combustion judging means to make the intake gas mixture rich when the combustion condition is unstable beyond a predetermined allowance, and to make the intake gas mixture lean when the combustion condition is stable within the predetermined allowance.

* * * * *